(12) United States Patent
Liu et al.

(10) Patent No.: US 8,186,866 B2
(45) Date of Patent: May 29, 2012

(54) METALLIC PANEL ASSEMBLY HAVING MULTILAYER ARRAYS OF MICROPORES

(75) Inventors: Chang-Li Liu, Taoyuan (TW); Che-Tung Wu, Taoyuan (TW)

(73) Assignee: Ichia Technologies, Inc., Taoyuan (TW)

( * ) Notice: Subject to any disclaimer, the term of this patent is extended or adjusted under 35 U.S.C. 154(b) by 1162 days.

(21) Appl. No.: 12/018,897

(22) Filed: Jan. 24, 2008

(65) Prior Publication Data

US 2009/0175440 A1 Jul. 9, 2009

(30) Foreign Application Priority Data

Jan. 3, 2008 (TW) ................................ 97200113 U

(51) Int. Cl.
*F21V 8/00* (2006.01)
(52) U.S. Cl. .......... 362/616; 362/615; 362/30; 200/313; 200/314
(58) Field of Classification Search .................. 362/235, 362/616, 612–613, 623, 625–627, 24, 29–30, 362/615, 617–619; 200/310, 311, 313, 314, 200/317
See application file for complete search history.

(56) References Cited

U.S. PATENT DOCUMENTS 4,811,175 A * 3/1989 DeSmet ........................ 362/95
2008/0073186 A1 * 3/2008 Kenmochi ..................... 200/5 A
2008/0117635 A1 * 5/2008 Chen ............................ 362/293
2008/0128254 A1 * 6/2008 Jung et al. ..................... 200/512

* cited by examiner

*Primary Examiner* — Robert May
(74) *Attorney, Agent, or Firm* — Chun-Ming Shih; HDLS IPR Services

(57) ABSTRACT

A metallic panel assembly having multilayer arrays of micropores includes a backlight module and a panel body. The backlight module is constituted of a first and a second light-guiding plate. First and second light-guiding microstructures are provided on the first and second light-guiding plates. A first and a second set of light-emitting units are disposed on one end of the first and second light-guiding plates, respectively. A first and a second shielding unit are disposed on the first and second light-guiding plates and the first and second sets of light-emitting units respectively. The panel body is disposed on one side surface of the first light-guiding plate. The panel body has thereon a plurality of hollowed portions with the hollowed portions encircling a key body. The key body has thereon a plurality of micropores. The plurality of micropores is arranged to form a pattern of each key body. When the first or second set of light-emitting units are lighted up, the light enters one side of the first or second light-guiding plate. The light is reflected by the first or second light-guiding microstructures on the corresponding key panel, so that the user can see the position of each key clearly.

22 Claims, 11 Drawing Sheets

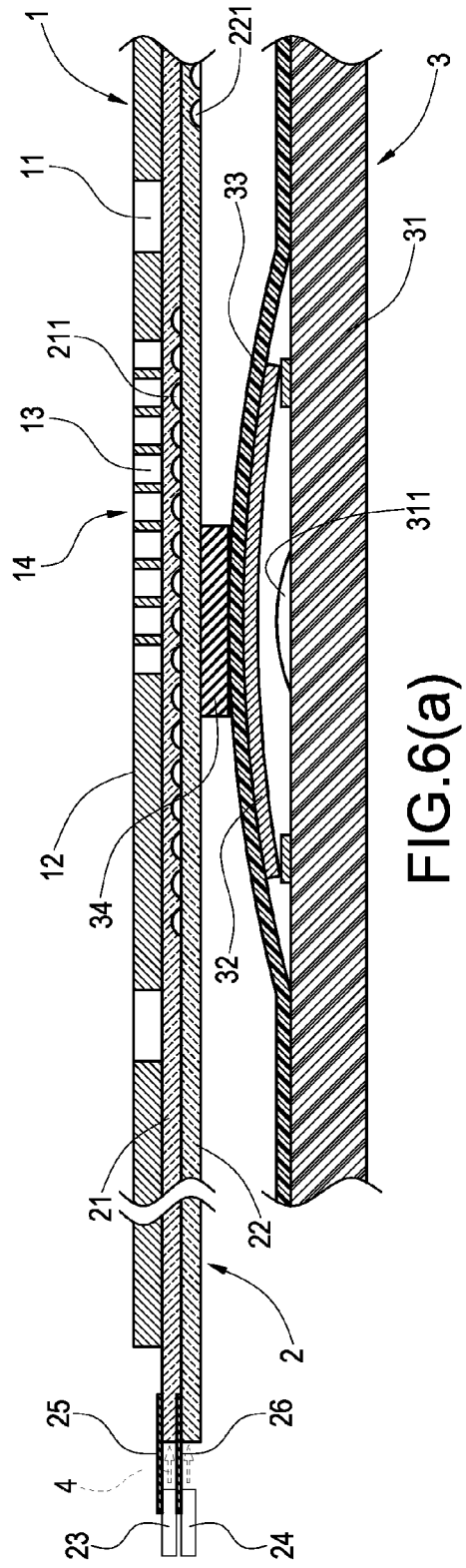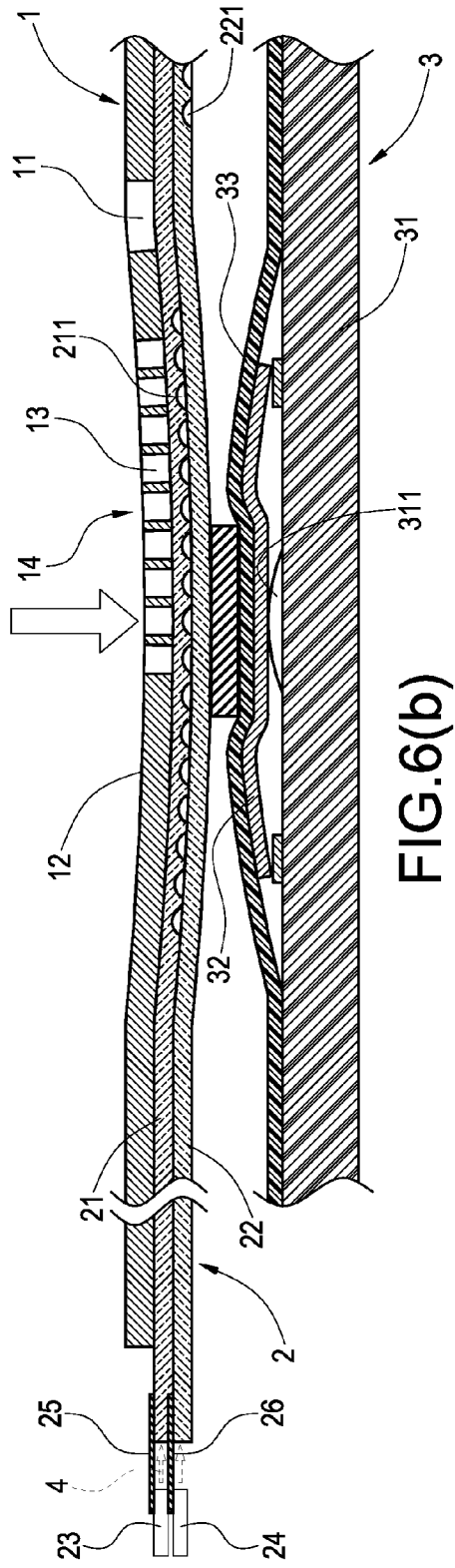

METALLIC PANEL ASSEMBLY HAVING MULTILAYER ARRAYS OF MICROPORES

RELATED APPLICATIONS

U.S. patent applications Ser. No. 11/560,962 filed on Nov. 17, 2006, Ser. No. 11/957,771 filed on Dec. 17, 2007 and Ser. No. 12/014,857 filed on Jan. 17, 2006 are submitted as related applications.

BACKGROUND OF THE INVENTION

1. Field of the Invention

The present invention relates to a panel, and in particular to a metallic key panel assembly.

2. Description of Prior Art

With the continuous progress of communication technologies, many electronic products are manufactured to a more compact extent so as to reduce the size and weight of the electronic product. Thus, it is convenient for a user to carry about such a compact electronic product. In order to reduce the size and weight of the electronic product, not only the volume of the internal integrated circuit is reduced, but also the area and thickness of a keyboard on an operating interface of the electronic product should be reduced. As a result, the electronic product can be mounted on a communication device easily.

As shown in FIGS. 1(a) and 1(b), US Patent Publication No. 2007/0205986A1 discloses a conventional metallic panel 10a having an elastic layer 1a. One side surface of the elastic layer 1a has thereon a plurality of protrusions 11a. The other side surface of the elastic layer 1a is arranged with a plurality of metallic keys 2a to correspond to the protrusions 11a. The metallic key 2a has a hollowed portion 21a with a corresponding pattern. A light transmittable resin layer 22a is filled in the hollowed portion 21a. When the metallic key panel 10a is disposed in a base 20a of an electronic device, the metallic key panel 10a is located on a telecommunication module 30a. The telecommunication module 30a has a printed circuit board 31a. The circuit board 31a has a plurality of immovable contacting points 32a. A metallic sheet 33a is disposed on the circuit board 31a. The metallic sheet 33a has thereon a plurality of convex metal domes 331a. The metal dome 331a corresponds to each contacting point 32a, and the other side surface of the metal sheet 331a corresponds to the protrusion 11a. When the metallic key 2a is pressed, the protrusion 11a is caused to press the surface of the metal dome 331a, so that the metal dome 331a is deformed and brought into contact with the contacting point 32a, thereby generating an electronic signal output. Further, when a backlight source is lighted up, the light of the backlight source can pass through the resin layer 22a of the metallic key 2a, so that the user can see the position of each key clearly.

Although the above-mentioned metallic key panel 10a has been manufactured to a more compact extent and can be mounted in a small-volume electronic device, during the manufacturing process, it is necessary to fill the individual hollowed portions 21a on the metallic key 2a with the resin layer 22a, and each of the metallic keys 2a has to be adhered onto one side surface of the elastic layer 1a accurately. As a result, the manufacturing process takes a lot of time and labors and is not simple. After the metallic key panel 10a is combined with the base 20a, a gap is formed between the periphery of the metallic key 2a and the base 20a, and the gap may be filled by external dusts or penetrated by moisture easily. As a result, the metallic key cannot be pressed smoothly or an internal short circuit may occur. Further, when the backlight source of the metallic panel 10a is lighted up, the hollowed portion 21a of the key 2a merely displays single luster. Therefore, the external appearance and the overall visual effect of the metallic key panel are dull.

SUMMARY OF THE INVENTION

In view of the above drawbacks, the present invention is to provide a metallic panel that is simple in structure and can be manufactured easily. Further, it has a multilayer backlight source, thereby increasing the whole external appearance and visual effect of the metallic key panel. Further, filler can be applied on the metallic panel, thereby protecting against the dust and the penetration of moisture.

The present invention is to provide a metallic panel assembly having multilayer arrays of micropores, which includes a backlight module and a panel body. The backlight module is constituted of a first and a second light-guiding plate. First and second light-guiding microstructures are provided on the first and second light-guiding plates. The first and second light-guiding microstructures are arranged alternatively. A first and a second set of light-emitting units are disposed on one end of the first and second light-guiding plates, respectively. A first and a second shielding unit are disposed on the first and second light-guiding plates and the first and second sets of light-emitting units respectively. The panel body is disposed on one side surface of the first light-guiding plate. The panel body has thereon a plurality of hollowed portions with the hollowed portions enclosing a key body. The key body has thereon a plurality of micropores. The plurality of micropores is arranged to form a pattern of each key body.

BRIEF DESCRIPTION OF THE DRAWINGS

FIG. 6(a) is an assembled side view showing the metallic panel, the backlight module and the telecommunication module of the present invention;

FIG. 6(b) is a schematic view showing a pressing action showing the metallic panel, the backlight module and the telecommunication module of the present invention;

DETAILED DESCRIPTION OF THE INVENTION

The detailed description and technical contents of the present invention will be explained with reference to the accompanying drawings.

Figure 1A:
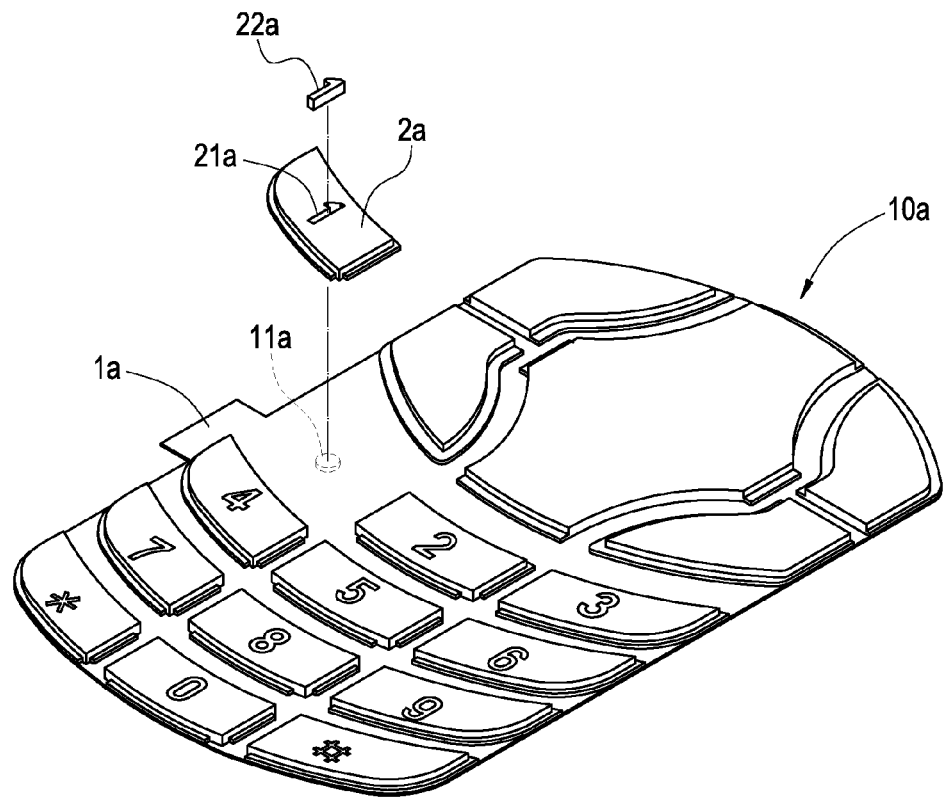
FIGS. 1(a) and 1(b) are schematic views showing a conventional metallic key panel.
Figure 1B:
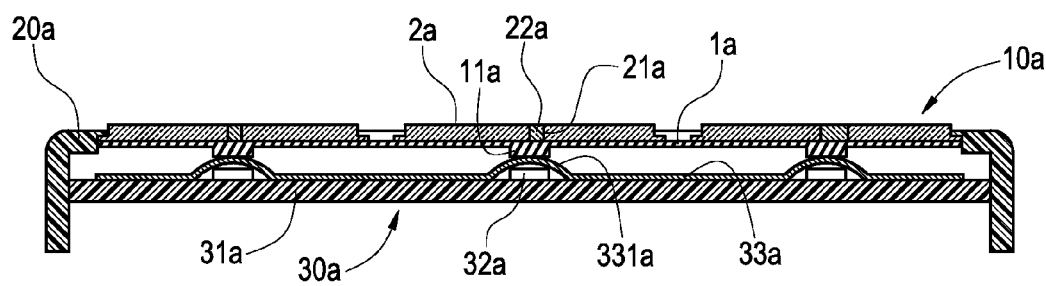
Figure 2:
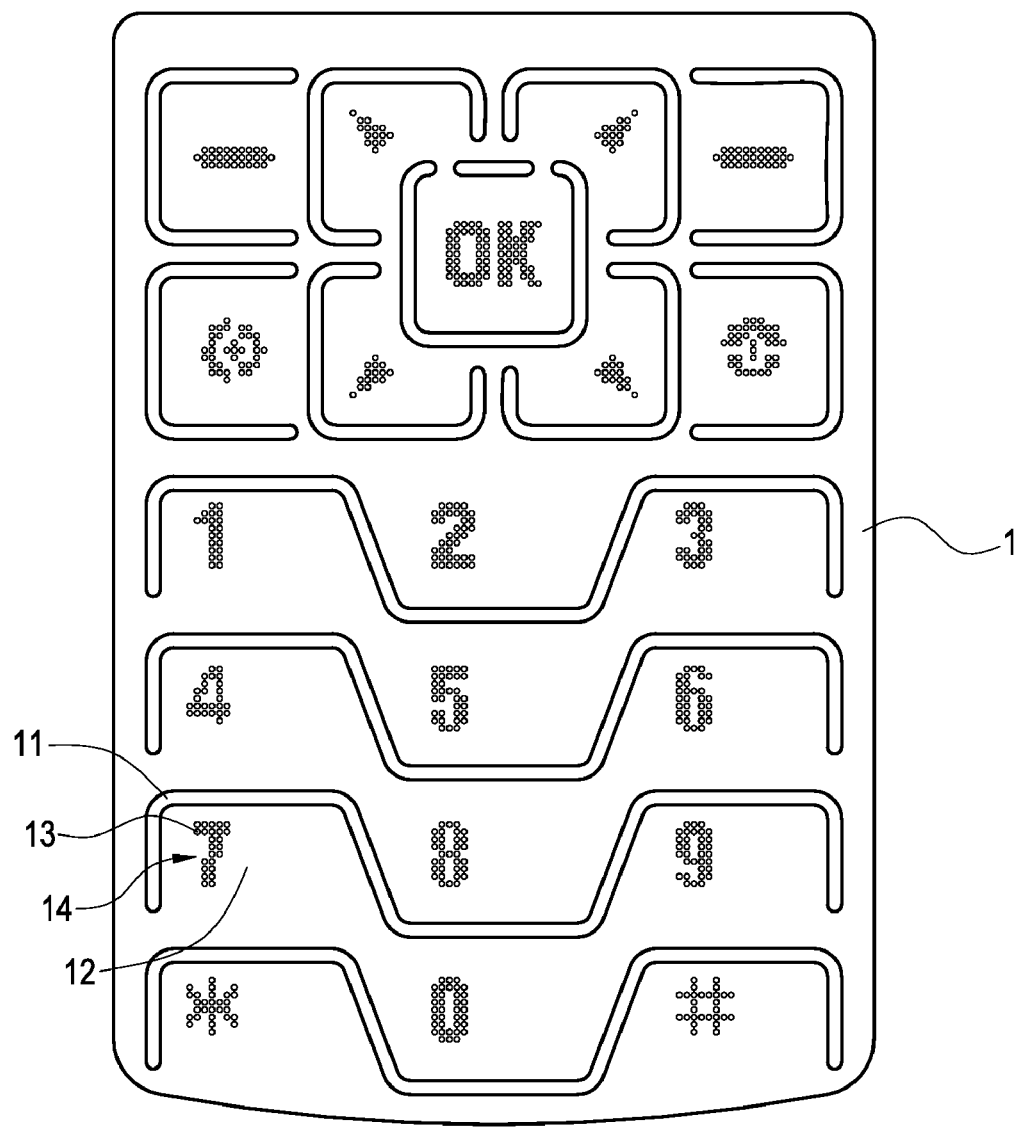
FIG. 2 is a front view showing the metallic panel of the present invention.
Figure 3:
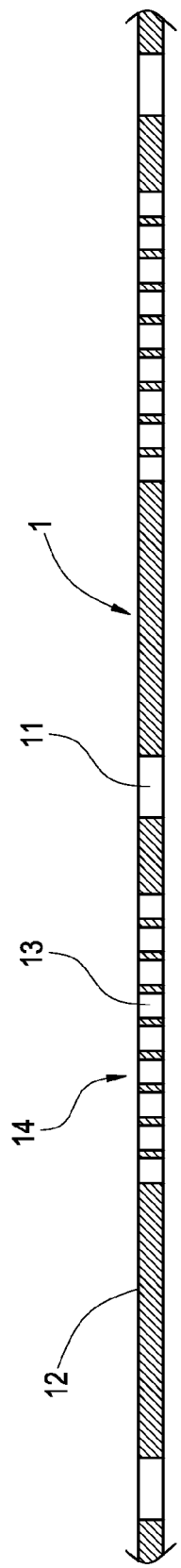
FIG. 3 is a side cross-sectional view showing the metallic panel of the present invention.

FIG. 2 is a front view showing the metallic panel of the present invention, and FIG. 3 is a side cross-sectional view showing the metallic panel of the present invention. As shown in these figures, according to the present invention, the metallic panel assembly having multilayer arrays of micropores has a panel body 1 made of a stainless steel (SUS) or Al—Mg alloy. The panel body 1 has thereon a plurality of hollowed portions 11 with the hollowed portions 11 encircling a key body 12. The key body 12 has thereon a plurality of micropores 13. The plurality of micropores 13 are arranged to form a pattern 14 of each key body 12. A user can operate the functions of the key bodies 12 according to the patterns 14. In the drawing, the pattern 14 is any one of numerals, characters, specific symbols ("#", "*", ".") and direction symbols.

Figure 4:
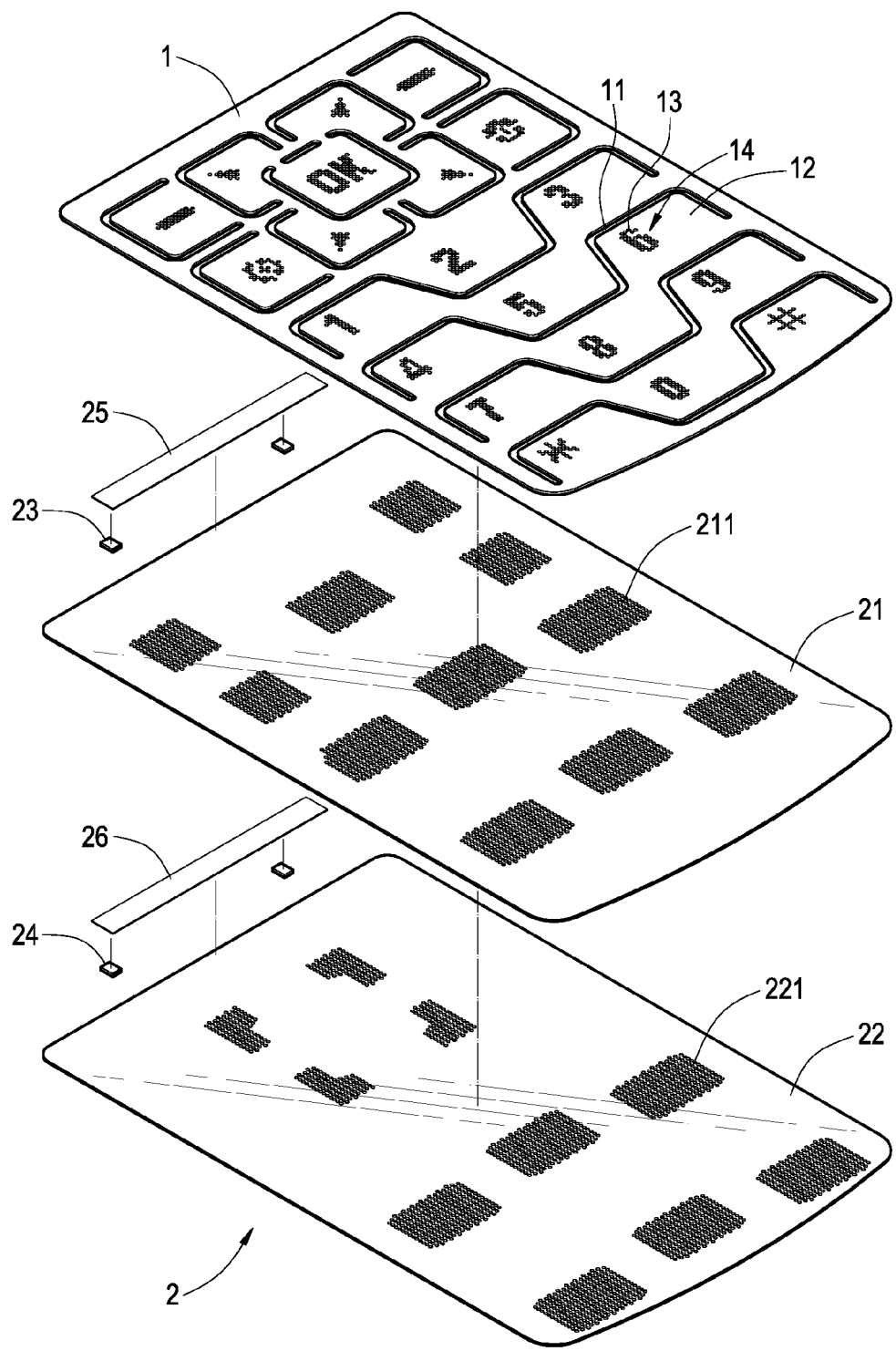
FIG. 4 is an exploded view showing the metallic panel and the backlight module of the present invention.
Figure 5:
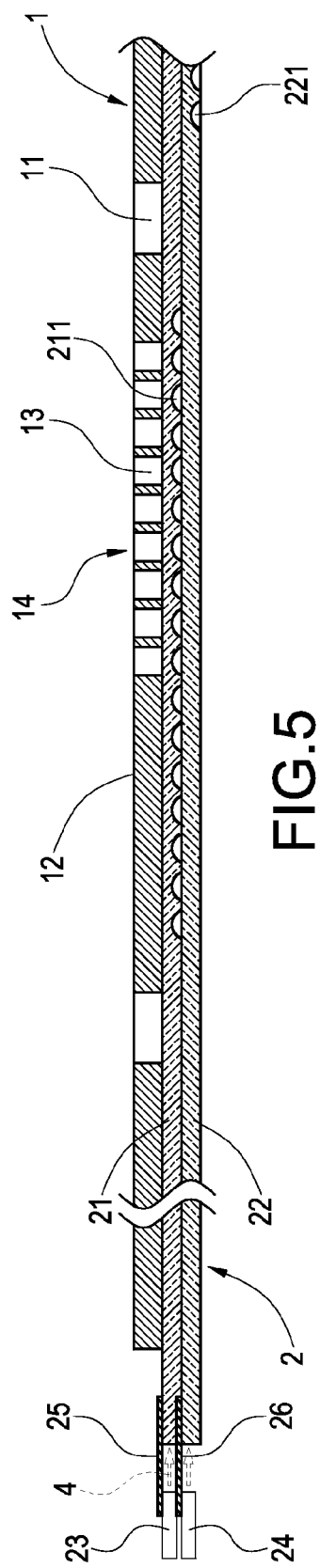
FIG. 5 is an assembled cross-sectional view showing the metallic panel and the backlight module of the present invention.

FIG. 4 is an exploded view showing the metallic panel and the backlight module of the present invention, and FIG. 5 is an assembled cross-sectional view showing the metallic panel and the backlight module of the present invention. As shown in these figures, a multilayer backlight module 2 is arranged on one side surface of the panel body 1, which includes: a first light-guiding plate 21, a second light-guiding plate 22, a first set of light-emitting units 23, a second set of light-emitting units 24, a first shielding unit 25 and a second shielding unit 26.

The first light-guiding plate 21 is formed into a plate body and has a plurality of first light-guiding microstructures 211. The first light-guiding microstructures 211 correspond to the key bodies 12. The first light-guiding microstructures 211 are recessed in or protrude from one side surface of the first light-guiding plate 21.

The second light-guiding plate 22 is formed into a plate body and has a plurality of second light-guiding microstructures 221. The second light-guiding microstructures 221 correspond to the key bodies 12. The first light-guiding microstructures 211 and the second light-guiding microstructures 221 are arranged alternatively to correspond to the key bodies 12. The second light-guiding microstructures 221 are recessed in or protrude from one side surface of the second light-guiding plate 22.

The first set of light-emitting units 23 are constituted of a plurality of light-emitting diodes having the same or different colors, and are arranged on one side of the first light-guiding plate 21.

The second set of light-emitting units 24 are constituted of a plurality of light-emitting diodes having the same or different colors, and are arranged on one side of the second light-guiding plate 22.

The first shielding unit 25 is formed into a sheet and is arranged above the first light-guiding plate 21 and the first set of light-emitting units 23, thereby avoiding the interference of lights generated by the first and second sets of light-emitting units 23, 24.

The second shielding unit 26 is formed into a sheet and is arranged above the second light-guiding plate 22 and the second set of light-emitting units 24, thereby avoiding the interference of lights generated by the first and second sets of light-emitting units 23, 24.

Under the control of the circuit (not shown) of an associated electronic device, when one of the first set of light-emitting units 23 and the second set of light-emitting units 24 are lighted up, the light generated by the first set of light-emitting units 23 or the second set of light-emitting units 24 enters one end of the first light-guiding plate 21 or the second light-guiding plate 22. Then, the light 4 is reflected by the first light-guiding microstructure 211 or the second light-guiding microstructure 221 onto the key body 13. The light 4 passes through the plurality of micropores 11 to display the pattern 14 on the surface of the key body 13. When one of the first set of light-emitting units 23 and the second set of light-emitting units 24 are lighted up, only the patterns 14 on several rows or lines of key bodies 13 on the metallic panel can be displayed, thereby facilitating the user to operate a TV game or multimedia.

When the first set of light-emitting units 23 and the second set of light-emitting units 24 are lighted up at the same time, the patterns 14 on several rows or lines of key bodies 13 on the metallic panel 1 are displayed to have the same color, while some other rows or lines will display another color. Alternatively, the lights generated by the first set of light-emitting units 23 and the second set of light-emitting units 24 are mixed to generate a light 4 of a third kind of color.

Please refer to FIGS. 6(a) and 6(b). FIG. 6(a) is an assembled side view showing the metallic panel, the backlight module and the telecommunication module of the present invention, and FIG. 6(b) is a schematic view showing a pressing action of the present invention. As shown in these figures, a telecommunication module 3 is adhered on one side surface of the backlight module 2. The telecommunication module 3 has a flexible printed circuit board (FPCB) 31. The circuit board 31 is provided thereon with a plurality of contacting points 311. Each contacting point 311 corresponds to a metal dome 32. A film layer 33 is disposed on one side surface of the circuit board 31 and the metal dome 32. One side surface of the protruding portion of the film layer 33 is provided with a protrusion 34. The protrusion 34 corresponds to the first and second light-guiding microstructures 211, 221 of the first and second light-guiding plates 21, 22.

When the surface of the key body 13 of the metallic panel 1 is pressed by an external force, the key body 13 is deformed to cause the protrusion 34 to press on the film layer 33. As a result, the metal dome 32 is deformed and pressed to contact with the contacting point 311, thereby generating a conductive signal output.

When one side surface of the metallic key panel 1 is not pressed by an external force, due to the elasticity of the metallic panel 1 and the metal dome 32, the metallic panel 1 may rise automatically to its original state.

Figure 7:
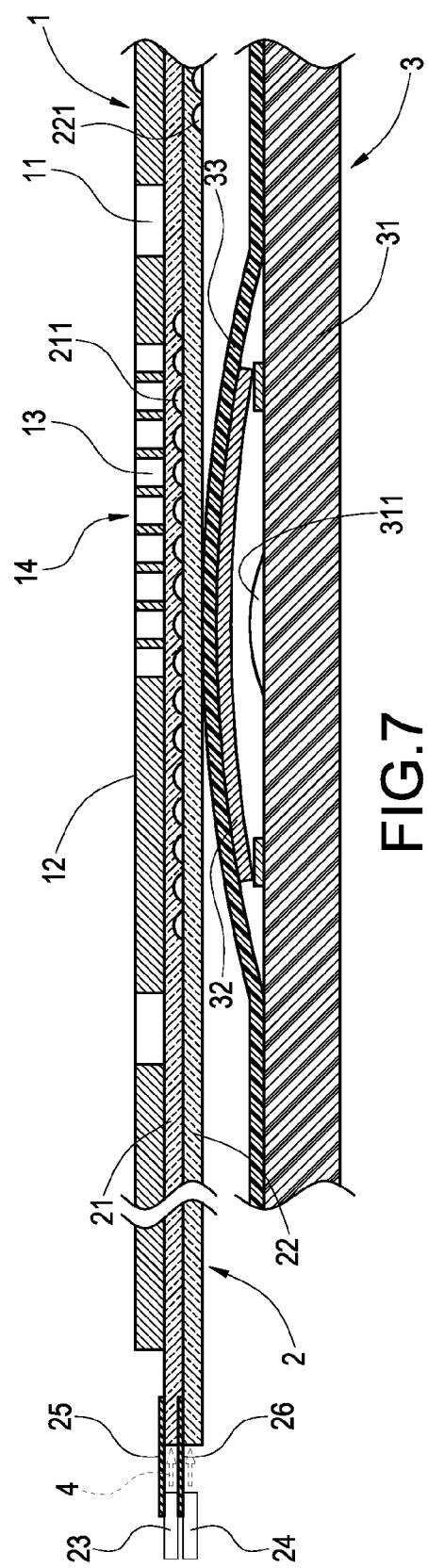
FIG. 7 is an assembled side view showing the metallic panel, the backlight module and another telecommunication module of the present invention.

Please refer to FIG. 7, it is an assembled side view showing the metallic panel, the backlight module and another telecommunication module of the present invention. As shown in this figure, another telecommunication module 3 is arranged on one side surface of the backlight module. The telecommunication module has a flexible printed circuit board (FPCB) 31. The circuit board 31 is provided thereon with a plurality of contacting points 311. Each contacting point 311 corresponds to a metal dome 32. A film layer 33 is arranged on one side surface of the circuit board 31 and the metal dome 32. The metal dome 33 corresponds to the first and second light-guiding microstructures 211, 221 on the first and second light-guiding plates 21, 22.

When the surface of the key body 13 on the metallic panel 1 is pressed by an external force, the key body 13 is deformed to press the film layer 33. As a result, the metal dome 32 is deformed and pressed to contact with the contacting point 311, thereby generating a conductive signal output.

When one side surface of the metallic key panel 1 is not pressed by an external force, due to the elasticity of the metallic panel 1 and the metal dome 32, the metallic panel 1 may rise automatically to its original state.

Figure 8:
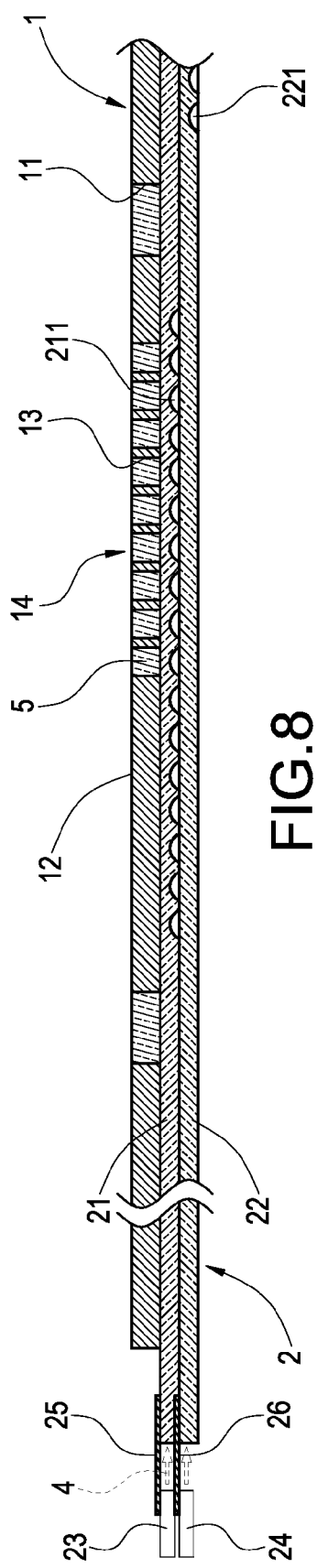
FIG. 8 is a schematic view showing another embodiment of the present invention.

Please refer to FIG. 8, which is a schematic view showing another embodiment of the present invention. As shown in this figure, the plurality of micropores 11 on the metallic panel 1 can be filled with filler 5. Alternatively, the filler can be applied on the surface of the metallic key panel 1 with the filler 5 penetrating into the micropores 11, thereby avoiding the accumulation of dust and the penetration of moisture. In this figure, the filler 5 can be any one of UV glue, silicone, Vitro, epoxy or synthetic resin.

Figure 9:
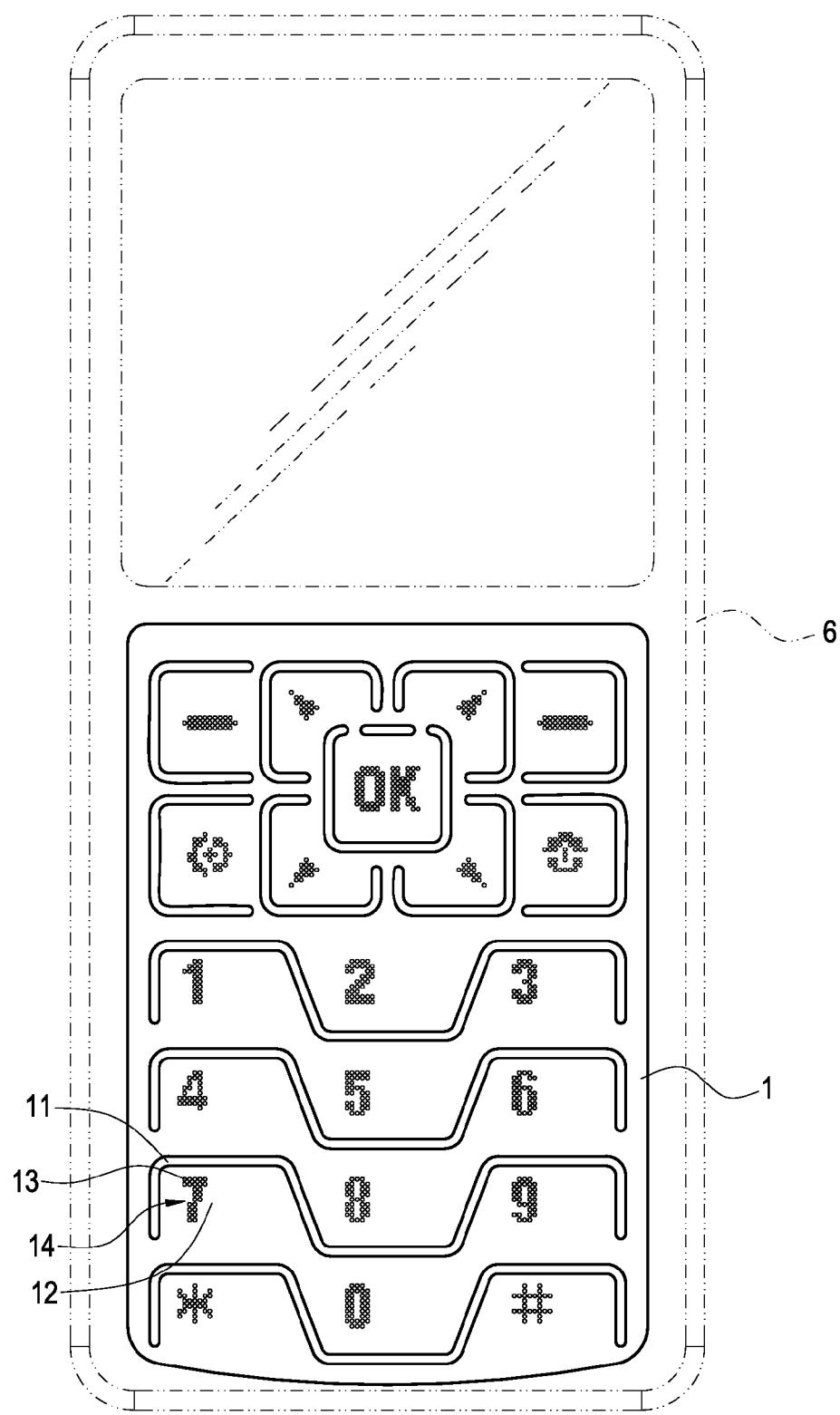
FIG. 9 is a schematic view showing the metallic panel of the present invention being used in a mobile phone.

With reference to FIG. 9, it is a schematic view showing the metallic panel of the present invention being used in a mobile phone. As shown in this figure, after the metallic panel 1 of the present invention is manufactured completely, it can be applied to a mobile phone 6. When the light illuminates the metallic panel 1, the metallic panel 1 generates a backlight of a luster, thereby increasing the aesthetic feeling of the mobile phone 6.

Figure 10:
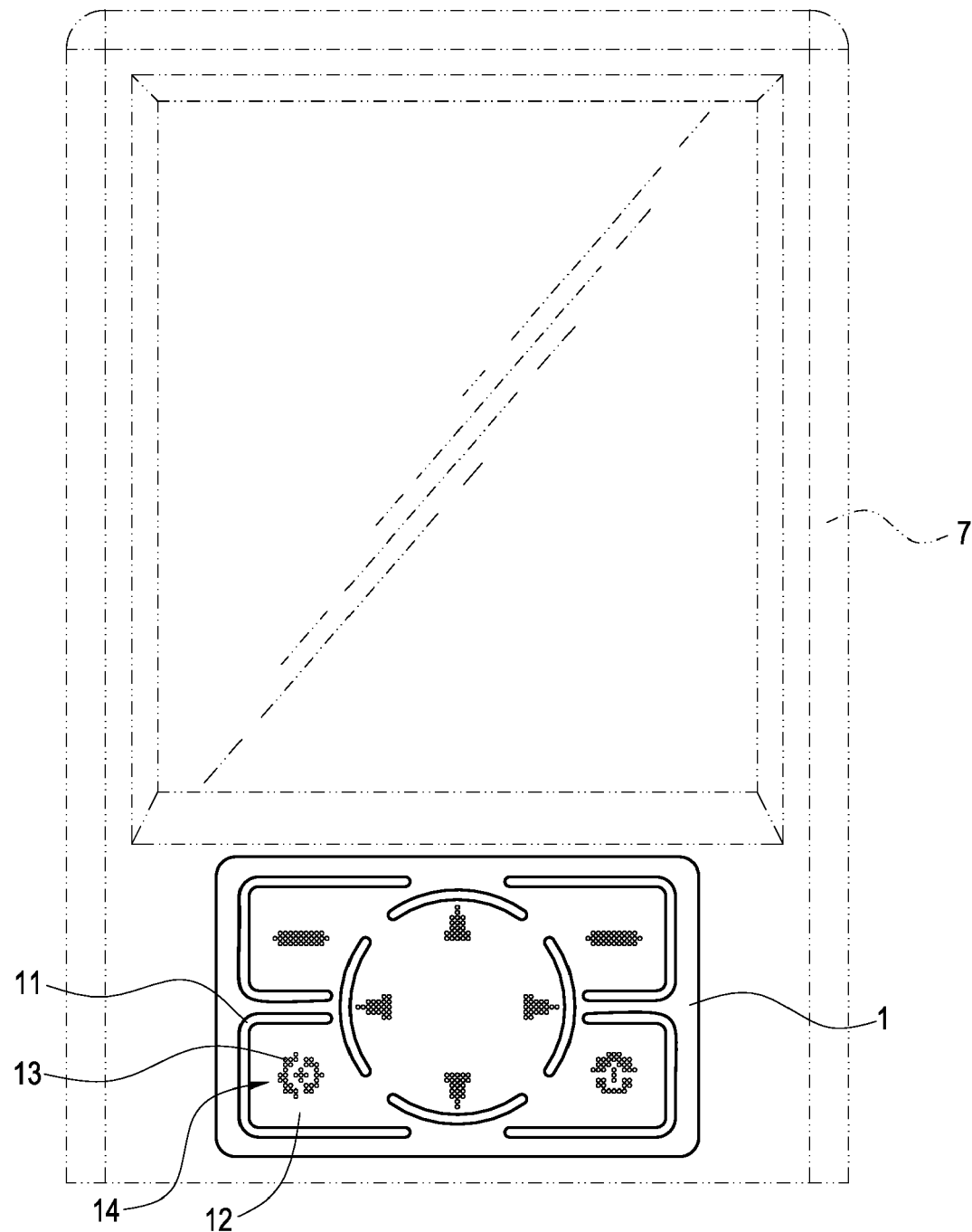
FIG. 10 is a schematic view showing the metallic panel of the present invention being used in a personal digital assistant.

With reference to FIG. 10, it is a schematic view showing the metallic panel of the present invention being used in a personal digital assistant. As shown in this figure, after the metallic panel 1 of the present invention is manufactured completely, in addition to the mobile phone 6, it can be applied to a personal digital assistant (PDA) 7. When the light illuminates the metallic panel 1, it generates a backlight of a luster, thereby increasing the aesthetic feeling of the personal digital assistant (PDA) 7.

Figure 11:
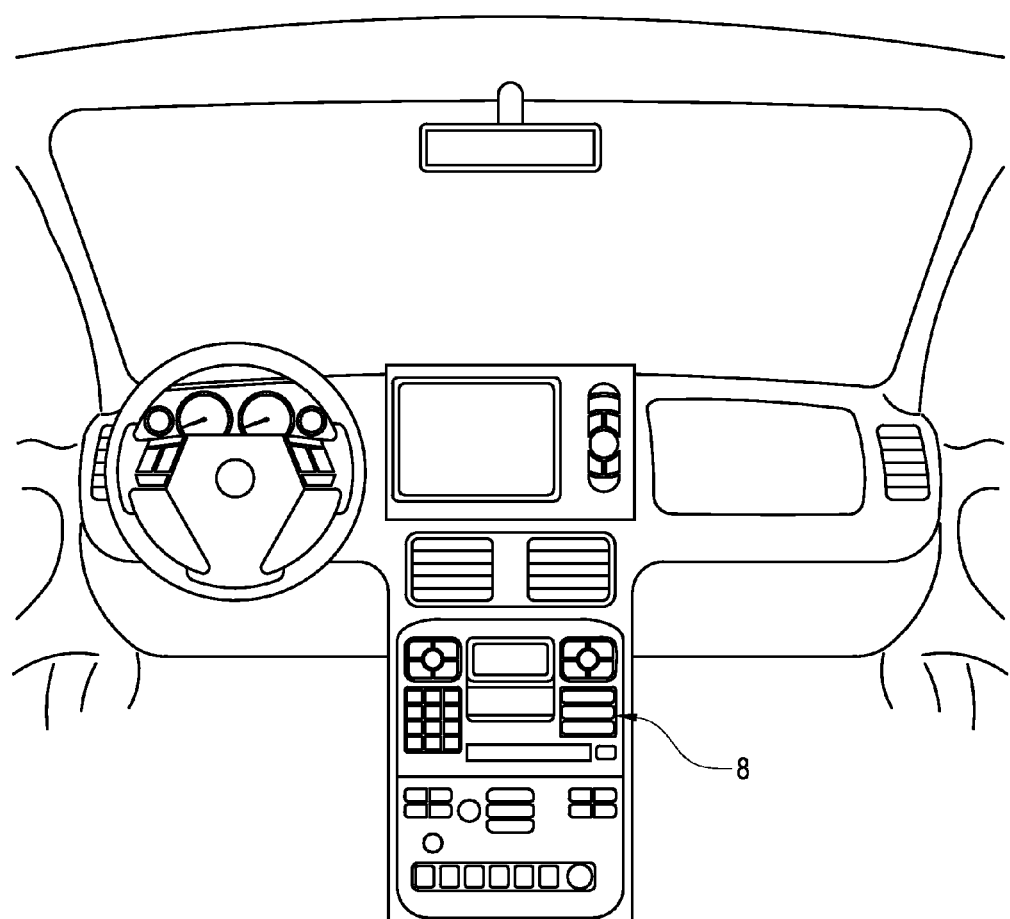
FIG. 11 is a schematic view showing the metallic panel of the present invention being used in an automobile stereo panel.

With reference to FIG. 11, it is a schematic view showing the metallic panel of the present invention being used in an automobile stereo panel. As shown in this figure, in addition to the mobile phone 6 and the personal digital assistant (PDA) 7, the metallic panel 1 of the present invention can be mounted in an automobile stereo panel 8, thereby controlling the operations of an air conditioning system, audio-video system and satellite navigation system.

Although the present invention has been described with reference to the foregoing preferred embodiments, it will be understood that the invention is not limited to the details thereof Various equivalent variations and modifications can still occur to those skilled in this art in view of the teachings of the present invention. Thus, all such variations and equivalent modifications are also embraced within the scope of the invention as defined in the appended claims.

What is claimed is:

1. A metallic panel assembly having multilayer arrays of micropores, the metallic panel assembly being disposed on a surface of an electronic device and comprising:
   a backlight module including a first light-guiding plate and a second light-guiding plate located on one side surface of the first light-guiding plate, the first and second light-guiding plates being provided with first and second light-guiding microstructures, the first light-guiding microstructures and the second light-guiding microstructures being arranged alternatively; a first set of light-emitting units and a second set of light-emitting units being arranged on one side of the first and second light-guiding plates respectively; a first shielding unit and a second shielding unit being arranged above the first and second light-guiding plates and the first and second sets of light-emitting units respectively; and
   a panel body arranged on the other side surface of the first light-guiding plate and having a plurality of stripe-like hollowed portions, each stripe-like hollowed portion encircling a key body of a predetermined shape, a plurality of micropores being provided on the surface of the key body, the plurality of micropores being arranged to form a pattern of the key body.

2. The metallic panel assembly having multilayer arrays of micropores according to claim 1, wherein the first and second light-guiding plates are formed into a plate body.

3. The metallic panel assembly having multilayer arrays of micropores according to claim 1, wherein the pattern comprises any one of numerals, characters, special symbols and direction symbols.

4. The metallic panel assembly having multilayer arrays of micropores according to claim 1, wherein the first light-guiding microstructures are recessed in or protrude from one side surface of the first light-guiding plate.

5. The metallic panel assembly having multilayer arrays of micropores according to claim 1, wherein the second light-guiding microstructures are recessed in or protrude from one side surface of the second light-guiding plate.

6. The metallic panel assembly having multilayer arrays of micropores according to claim 1, wherein the first and second sets of light-emitting units are constituted of a plurality of light-emitting diodes having the same or different colors.

7. The metallic panel assembly having multilayer arrays of micropores according to claim 1, wherein the first and second shielding units are formed into a sheet.

8. The metallic panel assembly having multilayer arrays of micropores according to claim 1, wherein the metallic key panel is any one of a stainless steel (SUS) or Al—Mg alloy.

9. The metallic panel assembly having multilayer arrays of micropores according to claim 1, wherein a filler is filled in the micropores on the panel body, or the filler is applied on the surface of the metallic key panel with the filler penetrating into the micropores.

10. The metallic panel assembly having multilayer arrays of micropores according to claim 9, wherein the filler is any one of UV glue, silicone, Vitro, epoxy or synthetic resin.

11. A metallic panel assembly having multilayer arrays of micropores, the metallic panel assembly being disposed on a surface of an electronic device and comprising:
   a backlight module including a first light-guiding plate and a second light-guiding plate located on one side surface of the first light-guiding plate, the first and second light-guiding plates being provided with first and second light-guiding microstructures, the first light-guiding microstructures and the second light-guiding microstructures being arranged alternatively; a first set of light-emitting units and a second set of light-emitting units being arranged on one side of the first and second light-guiding plates respectively; a first shielding unit and a second shielding unit being arranged above the first and second light-guiding plates and the first and second sets of light-emitting units respectively;
   a panel body arranged on the other side surface of the first light-guiding plate and having a plurality of stripe-like hollowed portions, each stripe-like hollowed portion encircling a key body of a predetermined shape, a plurality of micropores being provided on the surface of the key body, the plurality of micropores being arranged to form a pattern of the key body; and
   a telecommunication module arranged on one side surface of the second light-guiding plate.

12. The metallic panel assembly having multilayer arrays of micropores according to claim 11, wherein the first and second light-guiding plates are formed into a plate body.

13. The metallic panel assembly having multilayer arrays of micropores according to claim 11, wherein the pattern comprises any one of numerals, characters, special symbols and direction symbols.

14. The metallic panel assembly having multilayer arrays of micropores according to claim 11, wherein the first light-guiding microstructures are recessed in or protrude from one side surface of the first light-guiding plate.

15. The metallic panel assembly having multilayer arrays of micropores according to claim 11, wherein the second light-guiding microstructures are recessed in or protrude from one side surface of the second light-guiding plate.

16. The metallic panel assembly having multilayer arrays of micropores according to claim 11, wherein the first and second sets of light-emitting units are constituted of a plurality of light-emitting diodes having the same or different colors.

17. The metallic panel assembly having multilayer arrays of micropores according to claim 11, wherein the first and second shielding units are formed into a sheet.

18. The metallic panel assembly having multilayer arrays of micropores according to claim 11, wherein the metallic key panel is any one of a stainless steel (SUS) or Al—Mg alloy.

19. The metallic panel assembly having multilayer arrays of micropores according to claim 11, wherein a filler is filled in the micropores on the panel body, or the filler is applied on the surface of the metallic key panel with the filler penetrating into the micropores.

20. The metallic panel assembly having multilayer arrays of micropores according to claim 19, wherein the filler is any one of UV glue, silicone, Vitro, epoxy or synthetic resin.

21. The metallic panel assembly having multilayer arrays of micropores according to claim 11, wherein the telecommunication module has a flexible printed circuit board, the circuit board has thereon a plurality of contacting points, each contacting point corresponds to a metal dome, a film layer is arranged on one side surface of the circuit board and the metal dome, a protrusion is provided on one side surface of a protruding portion of the film layer.

22. The metallic panel assembly having multilayer arrays of micropores according to claim 11, wherein the telecommunication module has a flexible printed circuit board, the circuit board has thereon a plurality of contacting points, each contacting point corresponds to a metal dome, a film layer is arranged on one side surface of the circuit board and the metal dome.

* * * * *